(12) United States Patent
Jimenez et al.

(10) Patent No.: US 10,828,934 B2
(45) Date of Patent: Nov. 10, 2020

(54) SPACER TO ENHANCE LUBRICATION FOR WHEELEND ASSEMBLY

(71) Applicant: STEMCO PRODUCTS, INC., Charlotte, NC (US)

(72) Inventors: Daniel T. Jimenez, Diana, TX (US); Mark N. Gold, Hallsville, TX (US); David W. Bell, Hallsville, TX (US)

(73) Assignee: Stemco Products, Inc., Charlotte, NC (US)

( * ) Notice: Subject to any disclaimer, the term of this patent is extended or adjusted under 35 U.S.C. 154(b) by 0 days.

(21) Appl. No.: 16/606,711

(22) PCT Filed: Oct. 3, 2018

(86) PCT No.: PCT/US2018/054143
§ 371 (c)(1),
(2) Date: Oct. 18, 2019

(87) PCT Pub. No.: WO2019/070840
PCT Pub. Date: Apr. 11, 2019

(65) Prior Publication Data
US 2020/0223254 A1    Jul. 16, 2020

Related U.S. Application Data

(60) Provisional application No. 62/568,686, filed on Oct. 5, 2017.

(51) Int. Cl.
*B60B 27/00* (2006.01)
*F16C 19/54* (2006.01)
*F16C 33/66* (2006.01)

(52) U.S. Cl.
CPC ........ *B60B 27/0078* (2013.01); *F16C 19/548* (2013.01); *F16C 33/664* (2013.01); *B60B 27/001* (2013.01); *F16C 2240/30* (2013.01); *F16C 2326/02* (2013.01)

(58) Field of Classification Search
CPC .. F16C 2326/02; F16C 19/548; F16C 19/546; F16C 19/54; F16C 33/664; F16C 33/66; B60B 27/0078; B60B 27/001; B60B 27/0047; B60B 27/00; B60B 27/0005; B60B 27/0015
See application file for complete search history.

(56) References Cited

U.S. PATENT DOCUMENTS

| 5,904,427 A | 5/1999 | Braun et al. |
| 6,200,037 B1 | 3/2001 | Braun |
| 6,533,363 B1 | 3/2003 | Hayes et al. |

(Continued)

FOREIGN PATENT DOCUMENTS

| RU | 2574306 | 2/2016 |
| WO | 2019070840 | 4/2019 |

OTHER PUBLICATIONS

International Searching Authority, International Search Report and Written Opinion, PCT/US2018/054143, Applicant: Stemco Products, Inc., dated Jan. 17, 2019, 7 pages.

*Primary Examiner* — Scott A Browne
(74) *Attorney, Agent, or Firm* — Perkins Coie LLP

(57) ABSTRACT

A wheelend is provided. The wheelend includes a spacer having a plurality of perforations to place a hub sump in fluid communication with a cavity between the spacer and a spindle to facilitate lubricant flow.

9 Claims, 6 Drawing Sheets

(56) References Cited

U.S. PATENT DOCUMENTS

| | | | |
|---|---|---|---|
| 6,776,261 B2 * | 8/2004 | Eriksen | F16C 19/52 184/6.4 |
| 7,931,407 B2 * | 4/2011 | Begin | F16C 33/60 384/475 |
| 2003/0221911 A1 | 12/2003 | Eriksen et al. | |

* cited by examiner

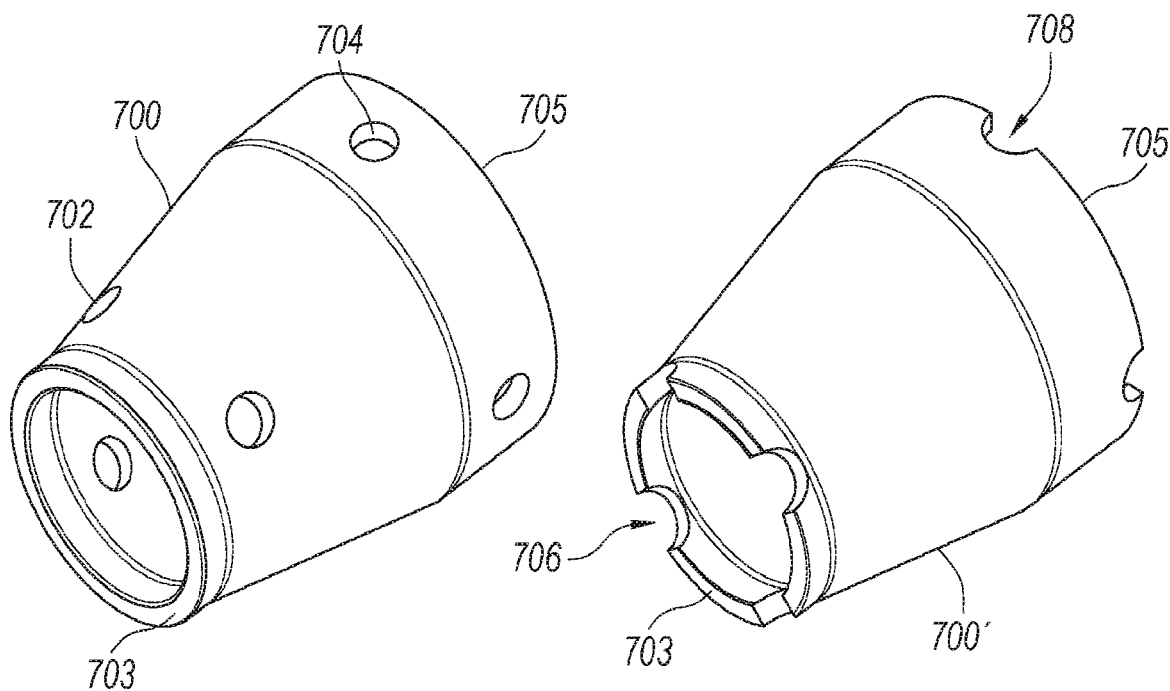
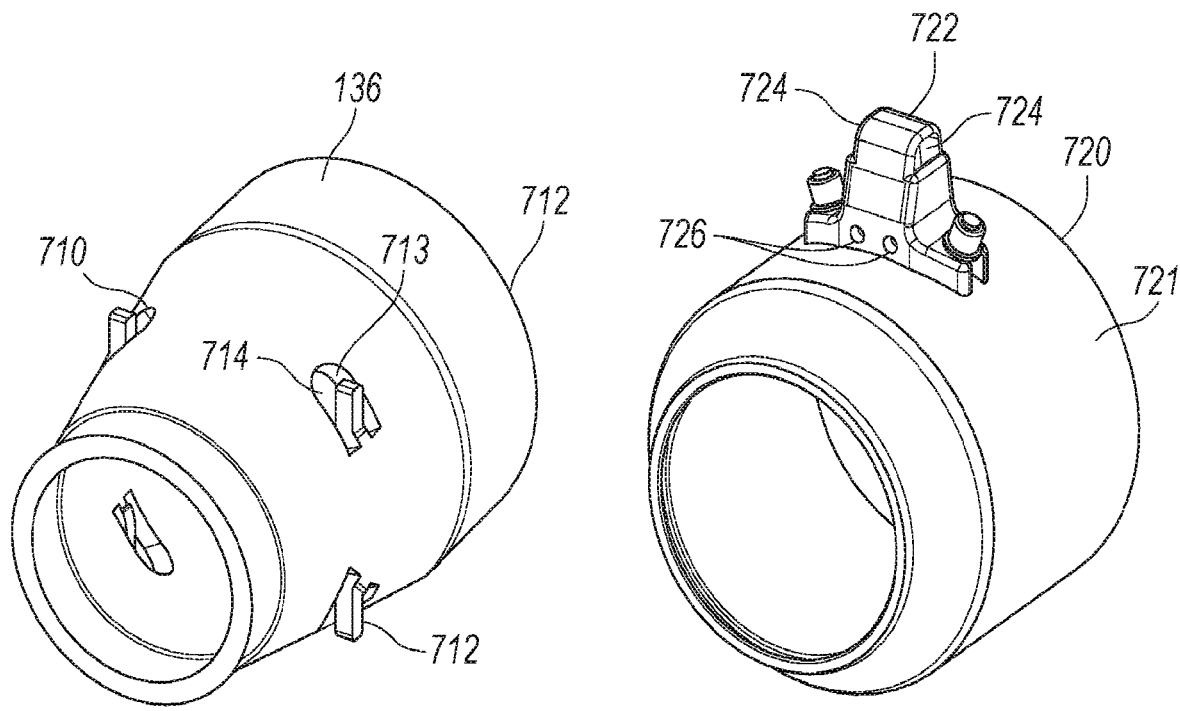

US 10,828,934 B2

SPACER TO ENHANCE LUBRICATION FOR WHEELEND ASSEMBLY

PRIORITY CLAIM

This application claims priority to U.S. Provisional Application No. 62/568,686 filed on Oct. 5, 2017, the entire contents of which is incorporated herein by reference and relied upon.

BACKGROUND

A wheelend assembly typically includes a main body or hub defining a cavity that receives an axle, spindle, or the like. The main body houses an inboard bearing assembly, a spacer, and an outboard bearing assembly. The spacer generally acts to maintain the distance between the inboard bearing assembly and the outboard bearing assembly and may allow limited movement of both such that the bearing and the associated race/cone can properly seat.

The inboard bearing assembly is on the inboard side and is bounded by an oil seal. The oil seal secures the inboard side of the wheelend assembly to inhibit the inboard bearing, the spacer, etc. from moving further. An end cap is typically placed over the outboard bearing and coupled to the main body to inhibit the wheelend assembly from unloading to the outboard side of the main body.

The race/cone for the bearings seat in the final assembly between outer surface of the axle and the inner surface of the main body. The bearings, as can be appreciated, may be misaligned with the axle outer surface when installing the wheelend assembly onto the axle. An alignment insert, such as a sleeve or the like, may be used to hold the outboard bearing assembly and spacer in alignment until the axle is inserted into the space and pushes the alignment insert out of the main body.

After the wheelend assembly is fitted onto the axle, the bearings assemblies are firmly set onto the axle, and the end cap is removed. An axle nut, or spindle nut, is next fitted over the axle and tightened to bear against the outboard surface of the outboard bearing assembly. The axle nut presses the outboard bearing assembly against the spacer and seats the outboard bearing in its race/cup. The axle nut also presses the inboard bearing assembly against an axle shoulder that seats the inboard bearing in its race/cone. The inner diameter (sometimes referred to as inner ring or inner race) of the outboard and inboard bearing assemblies require lubrication, which is preferably oil but may be other lubrication, as the wheel hub rotates about the stationary spindle or axle.

The conventional unitized wheelend assembly currently available has limited lubrication flow, especially the inner diameter components, such as the aforementioned inner diameter portions of the outboard and inboard bearing assemblies. The limited lubrication for the inner diameter components may cause metal to metal wear or fretting. Thus, against this background, it would be desirous to provide an improved spacer for unitized wheelend assembly to improve and, preferably, optimize lubrication flow to the inner diameter components.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, an improved spacer for a wheelend assembly is provided. The wheelend assembly includes a spacer configured between inboard and outboard bearing assemblies. The spacer includes a plurality of perforations to place a hub sump in fluid communication with a cavity between the spacer and a spindle to facilitate lubricant flow.

In some aspects of the technology, the spacer is a straight or semi straight spacer, which may be considered generally cylindrical or tubular. In other aspects, the spacer is a tapered or angled spacer, which is general frustoconical.

In some aspects of the technology, the spacer has a plurality of perforations along a circumference of the spacer at approximately the mid-point of the spacer. In other aspects, the spacer has perforations proximal the inboard or outboard portions/ends of the spacer.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 8 is a perspective view of spacers consistent with the technology of the present application.

FIG. 9 is a perspective view of a spacer consistent with the technology of the present application.

FIG. 10 is a perspective view of a spacer having a lubricant distribution vane consistent with the technology of the present application.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a unitized wheelend assembly. Unitized in this particular exemplary embodiment means a substantial portion of the wheelend assembly is assembled prior to installation on the axle/spindle. Typically, the unitized wheelend assembly includes at least an inboard bearing assembly and an outboard bearing assembly held in axial relation by a spacer. Various commercial unitized wheelend assemblies may have more or less components. The technology of the present application may be used with non-unitized wheelend assemblies as well. The technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
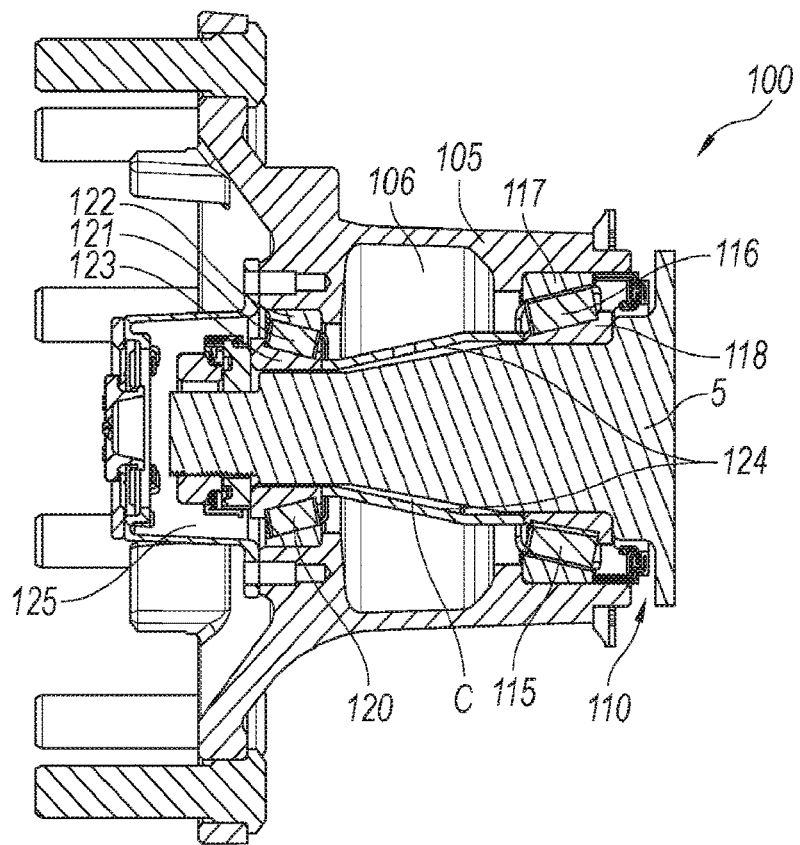
FIG. 1 is a cross-sectional view of a unitized wheelend assembly consistent with the technology of the present application.
Figure 2:
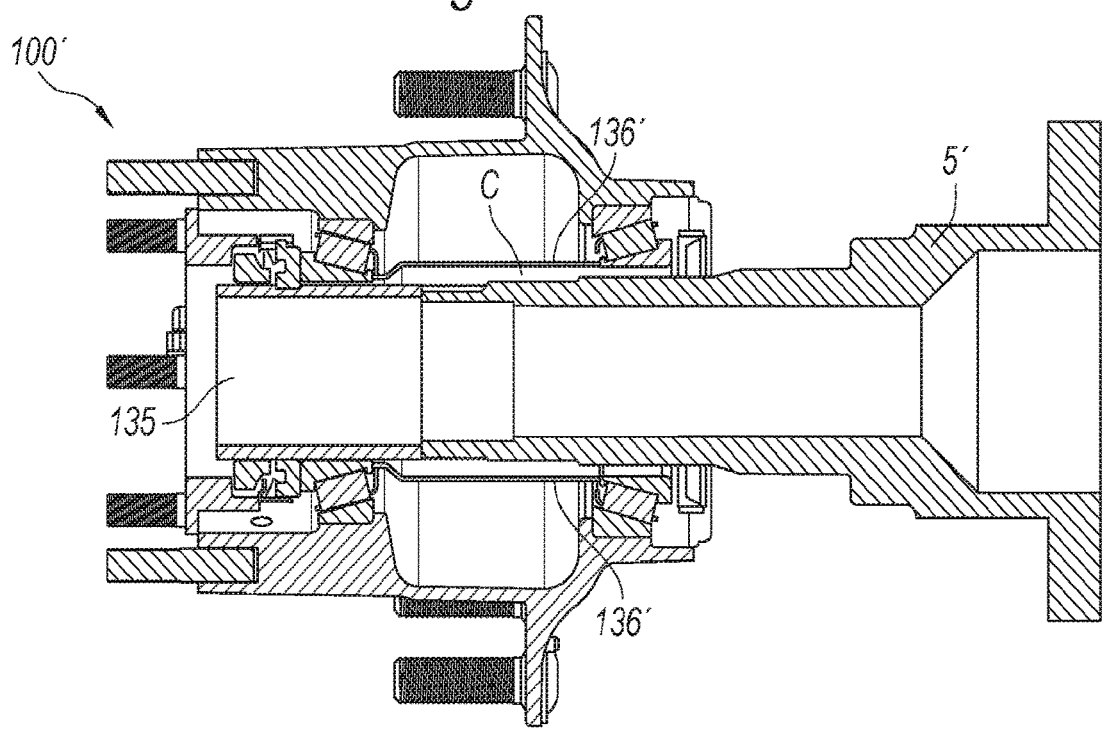
FIG. 2 is a cross-sectional view of a unitized wheelend assembly consistent with the technology of the present application.

With reference now to FIGS. 1 and 2, a cross sectional view of a unitized wheelend assembly 100 is provided. FIG. 1 shows the unitized wheelend assembly 100 installed whereas FIG. 2 shows the unitized wheelend assembly 100' partially installed. The unitized wheelend assemblies 100 and 100' are substantially the same, and will be explained using similar reference numbers for the various pieces and parts. The unitized wheelend assemblies 100, 100' are defined as unitized because they provide at least a portion of the wheelend in a prepackaged assembly for ease of installation on the spindle/axle of a vehicle. The unitized wheelend assemblies 100, 100' provide an assembly inclusive of a hub or main body 105 defining, among other things a hub sump 106, an inboard oil seal 110, an inboard bearing assembly 115 having a bearing 116, a bearing race 117, and a bearing cone 118, an outboard bearing assembly 120 having a bearing 121, a bearing race 122, and a bearing cone 123, a spacer 124 residing between the inboard bearing assembly 115 and the outboard bearing assembly 120, a unitized spindle nut assembly 125 having a washer, a collar, and a nut (in this exemplary spindle nut 125). The hub sump 106 may hold lubrication such as oil or the like as required. As shown in FIG. 1, the unitized wheelend assembly 100 is shown on spindle 5. Optionally, as shown in FIG. 2, an alignment insert 135 may be used in unitized wheelend assemblies 100, 100'. The alignment insert 135 maintains the alignment of the outboard bearing assembly 120 and spacer 136' (in FIG. 2) until the unitized wheelend assembly 100' is placed on the spindle 5'. The unitized wheelend assembly 100 also comprises a spacer 136. The spacer 136 and spacer 136' are similar, but the spacer 136 within unitized wheelend assembly 100 is tapered to match a tapered spindle 5 whereas the spacer 136' within unitized wheelend assembly 100' is not tapered to match the relatively cylindrical shape of spindle 5'. The spacer 136' may be a semi-straight configuration or a straight configuration.

Figure 3:
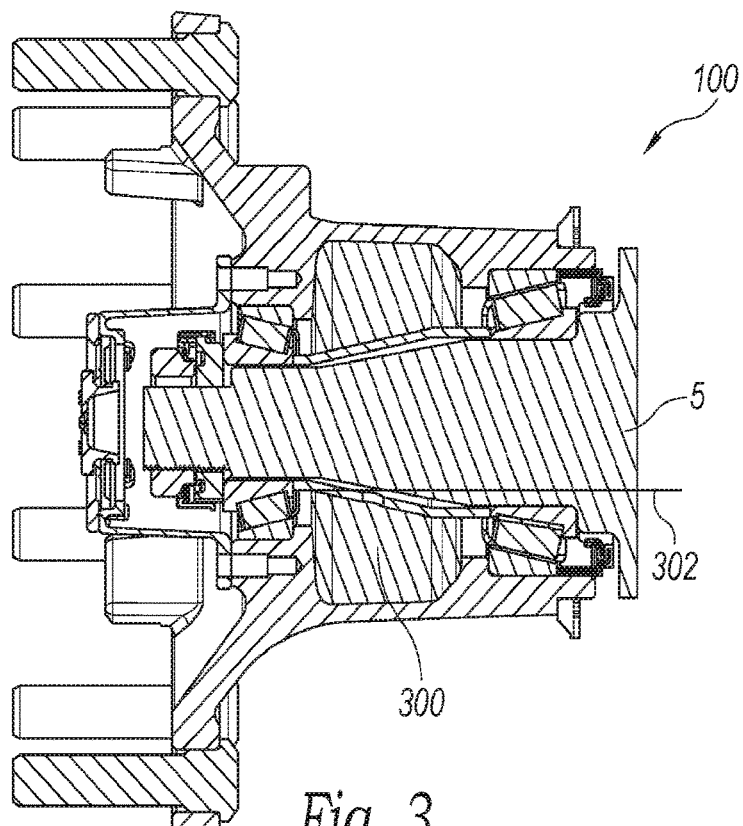
FIG. 3 is a cross-sectional view of the unitized wheelend assembly of FIG. 1 with an exemplary oil level when stationary.
Figure 4:
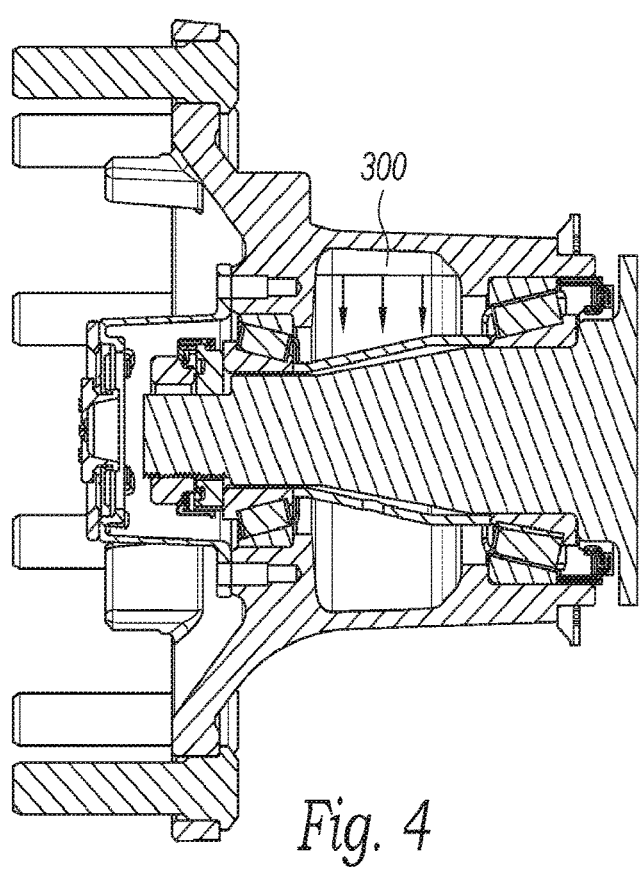
FIG. 4 is a cross sectional view of the unitized wheelend assembly of FIG. 3 when rotating.

FIGS. 3 and 4 show a unitized wheelend assembly 100 installed on a spindle 5. FIG. 3 shows lubricant 300 at lubrication level 302, which lubricant is typically oil, when the unitized wheelend assembly 100 is stationary (non-rotational). FIG. 4 shows the lubricant 300 when the unitized wheelend assembly 100 is rotating, which includes distribution of the lubricant via centrifugal forces and gravity.

Figure 5A:
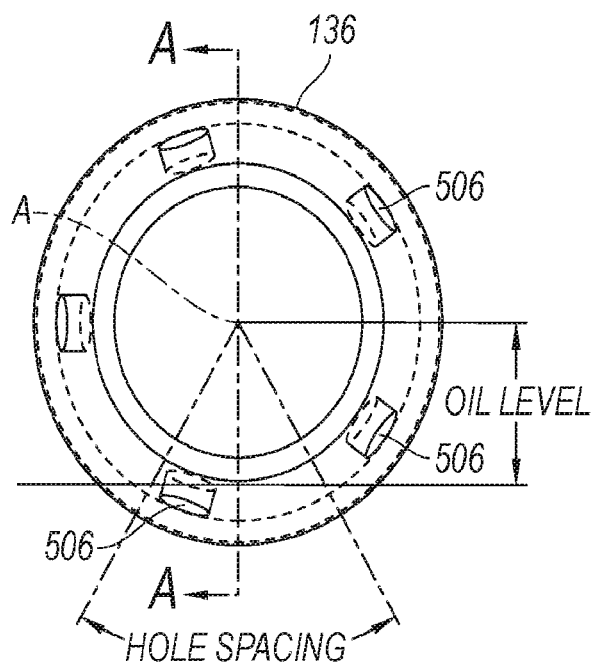
FIGS. 5a and 5b are views of a tapered spacer consistent with the technology of the present application.
Figure 5B:
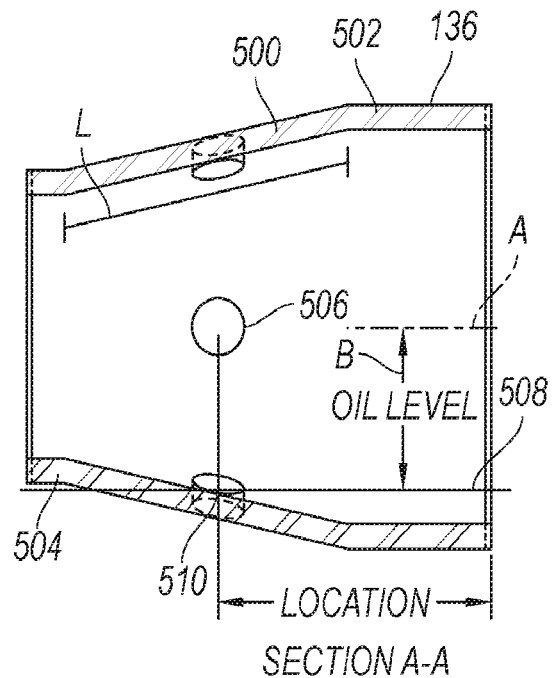

FIG. 5a is a view of the exemplary spacer 136 along its longitudinal axis A. FIG. 5b is a cross-sectional view of the exemplary spacer 136. Spacer 136 has a generally an intermediate portion 500 between an inboard portion 502 and an outboard portion 504. The pacer 136 has a frustoconical cone 500 as the intermediate portion 500. As shown, the inboard portion 502 and the outboard portion 504 generally form a cylindrical shape and is aligned with the longitudinal axis A. The frustoconical cone 500 between the inboard portion 502 and the outboard portion 504 has a length L. The inboard portion 502 is configured to press against the inboard bearing assembly 115 and the outboard portion 504 is configured to press against the outboard bearing assembly 120. The spacer 136 has a plurality of perforations 506, such as the shown bores 506, that penetrate through the spacer 136. The perforations 506 are located in the frustoconical cone 500 about halfway (L/2) between the inboard portion 502 and the outboard portion 504 in the shown embodiment, but the perforations 506 may be located elsewhere as will be shown in other figures below. FIGS. 5a and 5b show a desirous lubrication level 508. The lubrication level 508 is shown as being aligned with one of the plurality of perforations 506. As shown in FIG. 5a, the separation or spacing between the perforations 506 is somewhat based on the location of the perforation along the spacer 136 and the lubrication level 508. The plurality of perforations should be arranged such that at least one perforation is at or below the lubrication level 508 no matter what the orientation of the spacer 136 when the associated vehicle stops. The plurality of perforations 506 are shown symmetrically spaced on spacer 136 and arranged approximately 72 degrees apart in the shown symmetrical arrangement. The plurality of perforations 506 do not necessary need to be symmetrically spaced, but could be asymmetrical in certain embodiments. Generally, the plurality of perforations are separated by between about 45 to about 120 degrees. In the spacer of FIGS. 5a and 5b, the plurality of perforations would be between 3 and 8 perforations 506.

As best shown in FIG. 5b, the spacer 136 has a longitudinal axis A. The desired, or designed, lubrication level 508 is offset from the longitudinal axis A by a distance B, which would also equal a radius in this particular example. The location of the perforations 506 may be the intersection 510 of the lubrication level 508 with the frustoconical cone 500, which in this exemplary embodiment is located about halfway between the inboard portion 502 and the outboard portion 504. The intersection 510 of the lubrication level 508 and the frustoconical cone 500 also establishes the degree of separation between the plurality of perforations 506 as shown in FIG. 5a.

Figure 6A:
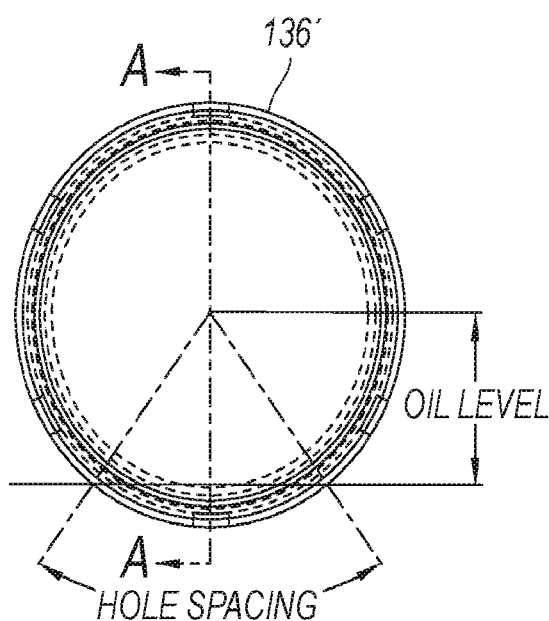
FIGS. 6a and 6b are views of a tapered spacer consistent with the technology of the present application.
Figure 6B:
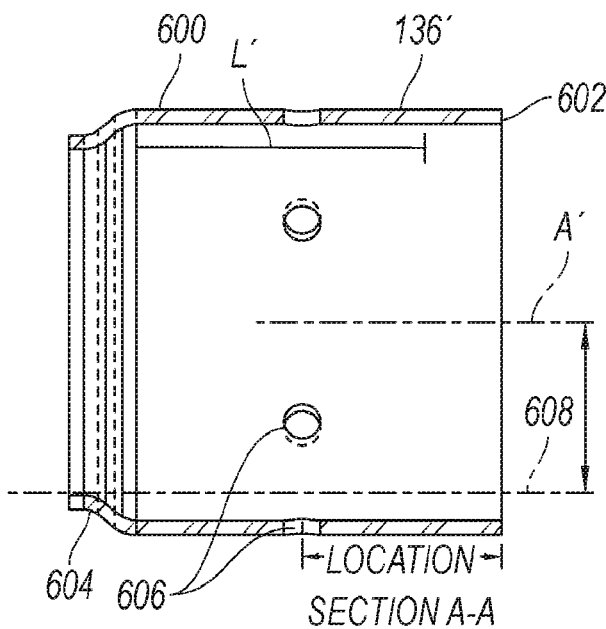

FIG. 6a is a view of the exemplary spacer 136' along its longitudinal axis A'. FIG. 6b is a cross-sectional view of the exemplary spacer 136'. Spacer 136' has an intermediate portion 600 between the inboard portion 602 and the outboard portion 604. The spacer 136' has a generally cylindrical tube 600. The intermediate portion 600 has a length L'. The inboard portion 602 is configured to press against the inboard bearing assembly 115 and the outboard portion 604 is configured to press against the outboard bearing assembly 120. The spacer 136' has a plurality of perforations 606, such as the shown bores 606, that penetrate through the spacer 136'. The perforations 606 are located in the cylindrical tube 600 about halfway (L/2) between the inboard portion 602 and the outboard portion 604 in the shown embodiment, but the perforations 606 may be located elsewhere as can be now appreciated. FIGS. 6a and 6b show a desirous oil level 608. While oil is called out in this particular example, the technology of the present application is applicable to other lubrication types, such as grease. The plurality of perforations 606 should be arranged such that at least one perforation is at or below the oil level 608 no matter what the orientation of the spacer 136' when the associated vehicle stops. The plurality of perforations 606 are shown symmetrically spaced on spacer 136' and arranged approximately 60 degrees apart in the shown symmetrical arrangement. Thus, there are six (6) perforations 606 in this exemplary embodiment. The plurality of perforations 606 do not necessary need to be symmetrically spaced, but could be asymmetrical in certain embodiments. Generally, the plurality of perforations are separated by between about 45 to about 120 degrees. In the spacer of FIGS. 6a and 6b, the plurality of perforations would be between 3 and 8 perforations 606.

With reference back to FIGS. 1 and 2, a cavity C exists between the spacer 136, 136' and the spindle 5, 5'. The perforation 506 shown in FIG. 1 allows a portion of the lubricant to flow into the cavity C to lubricate additional parts of the unitized wheelend assembly 100, 100'. For example, lubrication flow to the inner diameter of the inboard and outboard bearing assemblies 115, 120 is facilitated by the plurality of perforations 506.

Figure 7:
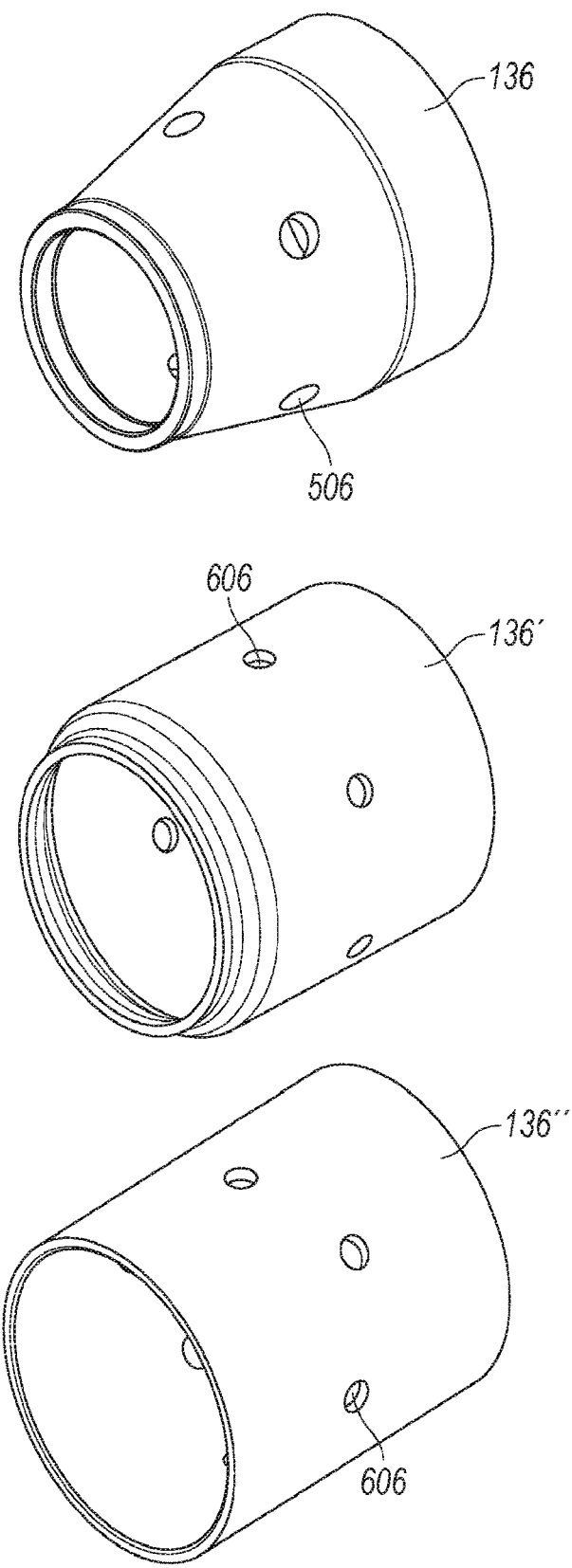
FIG. 7 is an isometric view of spacers consistent with the technology of the present application.

FIG. 7 shows isometric views of spacer 136, spacer 136', and spacer 136". The spacer 136 is a tapered or frustoconical shaped spacer. The spacer 136' is generally known as a semi-straight spacer 136' as the spacer 136' is generally a cylindrical tube with an offset at the inboard or outboard side of the spacer 136'. The spacer 136" is a straight spacer as the spacer 136' is a cylindrical tube from the inboard side to the outboard side. The perforations 506, 606 are generally shown at approximately the midway point between the inboard and outboard side of the spacers 136, 136', 136". For the semi-straight and straight spacers 136', 136", the placement of the plurality of perforations along the body of the spacer is not overly important when the vehicle is stationary (static) as the oil level in the straight spacers 136', 136" will seek a uniform level. Testing has indicated, however, that during vehicle motion (dynamic), location of the perforation towards the center position provides for improved lubrication flow into the cavity C. The location of the plurality of perforations for the tapered spacer 136, however, is important when the vehicle is stationary (static) and in motion (dynamic). If the perforations are only placed overly close to the narrow portion of the spacer 136 (generally the outboard side), the lubrication level may not be sufficiently high to allow lubrication into the cavity C when the vehicle is stationary. Also, while all the perforations are shown about a single diameter of the various spacers, the perforations may be about multiple diameters over the body of the spacer. For example, with reference to 8, isometric views of tapered spacers 700 and 700' are provided. Tapered spacer 700 provides a plurality of outboard perforations 702 proximal the outboard edge 703 of the spacer 700, and a plurality of inboard perforations 704 proximal the inboard edge 705 of the spacer 700. Tapered spacer 700' provides a plurality of outboard perforations 706 located on the outboard edge 703 of the spacer 700, and a plurality of inboard perforations 708 located on the inboard edge 705 of the spacer 700.

FIG. 9 shows a spacer similar to spacer 136 above. Spacer 136 has a plurality of perforations 710 located generally about a centerline of the spacer 136. The plurality of perforations 710 include a flow diverter 712, which is a column like protrusion extending from an edge 713 of the perforations 710. The flow diverter 712 is shown generally as extending along a tangent line into the opening 714 defined by the edge 713 of the perforations 710. The flow diverter 712, while shown as a column like protrusion, may take a number of shapes. As a vehicle moves, lubricant would flow and be directed by the flow diverter 712 towards the cavity C (see FIG. 1 or 2).

Figure 11:
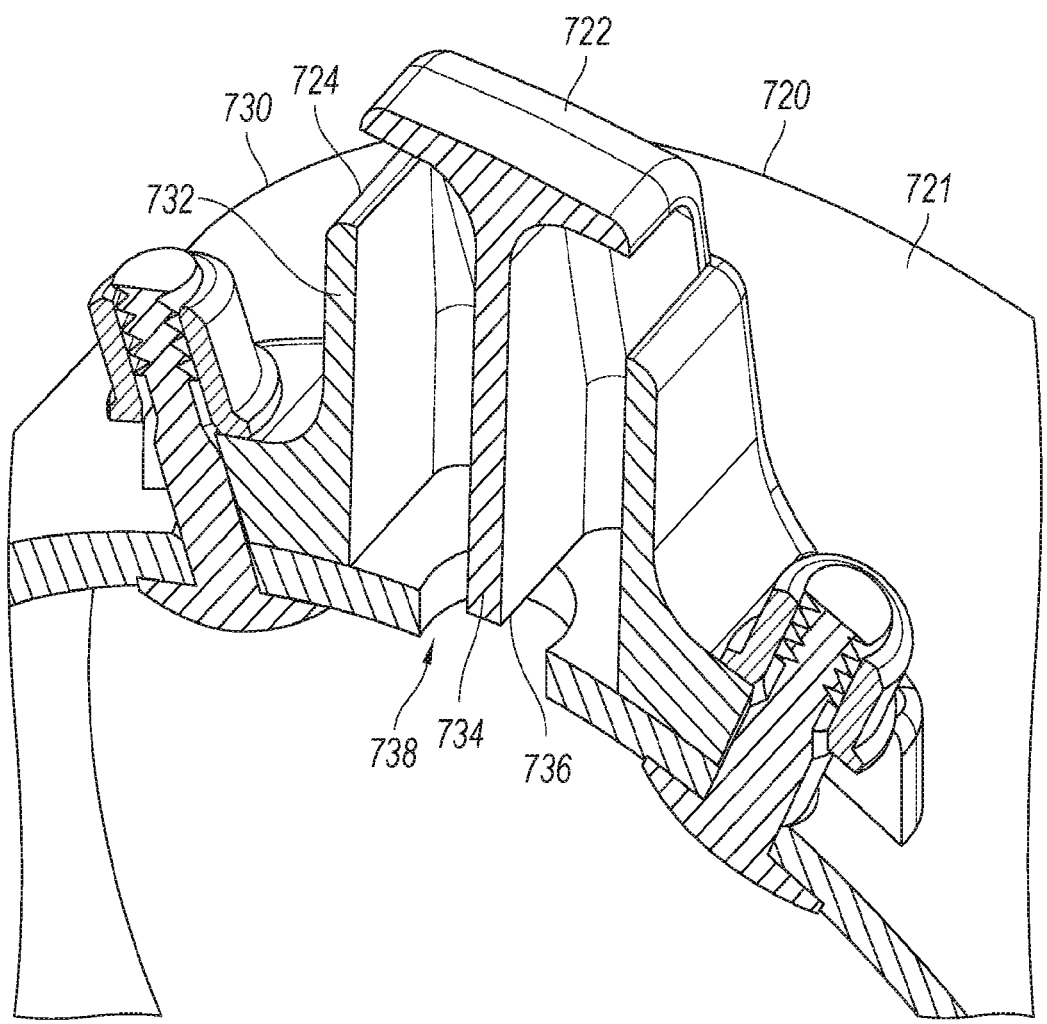
FIG. 11 is a cross-sectional/perspective of the spacer of FIG. 10.

FIG. 10 provides an isometric view of a semi-straight spacer 720 with a lubrication distribution vane 722 coupled to the outer surface 721 of the semi-straight spacer 720. The lubrication distribution vane 722 generally extends axially from the outer surface 721 into the hub sump 106 (see FIGS. 1 and 2). While shown on a semi-straight spacer 720, the lubrication distribution vane 722 is usable with other spacers. The lubrication distribution vane 722 includes an intake port 724 and outlet ports 726. The inlet port 724 has a greater cross-sectional area than the outlet ports 726 such that the outlet ports provide a jet for the lubrication to distribute the lubrication axially along the outer surface 721 of the semi-straight spacer 720 to the inboard and outboard bearing assemblies 115, 120. A lubricant distribution vane for a conventional spacer is described in U.S. Pat. No. 6,200,037, which is co-owned by the present applicant, and which issued Mar. 13, 2001, is incorporated herein by reference as if set out in full for all purposes. FIG. 11 is a cross-sectional view and detail of the lubrication distribution vane 722 mounted to the outer surface 721 of the spacer 720. As can be seen in FIG. 11, the lubrication distribution vane 722 has two (2) identical halves, only one of which is explained herein. The intake port 724 is in fluid communication with a radially extending passage 730 defined by an outer surface 732 of the lubrication distribution vane 722 and a dividing wall 734. The dividing wall 734 extends radially to the outer surface 721 and terminates at an end 736 positioned above the perforation 738. Thus, a portion of the lubricant is output through the outlet port 726 and a portion of the lubricant is output through the perforation 738 into the cavity C (FIGS. 1 and 2).

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:
1. A wheelend for a vehicle comprising:
a hub having an inboard, side and an outboard side, a hub sump formed in the hub between the inboard side and outboard side and configured to hold a lubricant;

an inboard bearing assembly having one or more inner diameter parts configured to reside on an, outer surface of a spindle;

an outboard bearing assembly having one, or m re inner diameter parts configured to reside on an outer surface of a spindle; and a spacer arranged at least in part in the hub sump and having an inboard portion and an outboard portion separated by an intermediate portion, the intermediate portion of the spacer having length such that the spacer maintains a distance between the inboard bearing assembly and the outboard bearing assembly, the spacer being configured to be spaced apart from the outer surface of the spindle such that a cavity exists between the spacer and the spindle, the spacer having a plurality of perforations placing the hub sump and the cavity in fluid communication, the plurality of perforations arranged on the spacer such that at least one perforation is located at or below minimum oil level in the hub sump when the wheelend is stationary, wherein the intermediate portion of the spacer is frusto-conical, and wherein the plurality of perforations comprise a first set of perforations located proximal the inboard portion of the spacer and a second set of perforations located proximal the outboard portion of the spacer.

2. A wheelend for a vehicle comprising:

hub having n board side and a outboard side, a hub sump formed in the hub between the inboard side and outboard side and configured to hold a lubricant;

an inboard bearing assembly having one or more inner diameter parts configured to reside on an outer surface of a spindle;

an outboard bearing assembly having one or more inner diameter parts configured to reside on an outer surface of a spindle; and a spacer arranged at least in part in the hub sump and having an inboard portion and an outboard portion separated by an intermediate, portion, the intermediate portion of the spacer having a length such that the spacer maintains a distance between the inboard bearing assembly and the outboard bearing assembly, the spacer being configured to be spaced apart from the outer surface of the spindle such that a cavity exists between the spacer and the spindle, the spacer having a plurality of perforations placing the hub sump and the cavity in fluid communication, the plurality of perforations arranged on the spacer such that at least one perforation is located at or below a minimum oil level in the hub sump when the wheelend is stationary, wherein the intermediate portion of the spacer is frusto-conical, and wherein the plurality of perforations comprise a first set of perforations located on an inboard edge of the spacer and a second set of perforations located on an outboard edge.

3. A wheelend for a vehicle comprising:

a hub having an inboard side and an outboard side, a hub sump formed in the hub between the inboard side and outboard side and configured to hold a lubricant;

an inboard bearing assembly having one or more inner diameter parts configured to reside on an outer surface of a spindle;

an outboard bearing assembly having one or more inner diameter parts configured to reside on an outer surface of a spindle; and a spacer arranged at least in, part in the hub sump and having an inboard portion and an outboard portion separated by an intermediate portion, the intermediate portion of the spacer having a length such that the spacer maintains a distance between the inboard bearing assembly and the outboard bearing assembly, the spacer being configured to be spaced apart from the outer surface of the spindle such that a cavity exists between the spacer and the spindle, the spacer having a plurality of perforations placing the hub sump and the cavity in fluid communication, the plurality of perforations arranged on the spacer such that at least one perforation is located at or below a minimum oil level in the huh sump when the wheelend is stationary, wherein each perforation, of the plurality of perforations are located on a circumference of the spacer and arranged symmetrically, and wherein each perforation of the plurality of perforations are arranged symmetrically on the circumference and separated by between about 45 to 120 degrees.

4. The wheelend of claim 3 wherein each perforation of the plurality of perforations is separated by between about 60 to 80 degrees.

5. The wheelend of claim 4 wherein each perforation of the plurality of perforations is separated by about 72 degrees.

6. A wheelend for a vehicle comprising:

a hub having an inboard side and an outboard side, a hub sump formed in the hub between the inboard side and outboard side and configured to hold a lubricant;

an inboard bearing assembly having one or more inner diameter parts configured to reside on an outer surface of a spindle;

an outboard bearing assembly having one or more inner diameter parts configured to reside an outer surface of a spindle;

a spacer arranged at least in part in the hub sump and having an inboard portion and an outboard portion separated by an intermediate portion, the intermediate portion of the spacer having a length such that the spacer maintains a distance between the inboard bearing assembly and the outboard bearing assembly, the spacer being configured to be spaced apart from the outer surface of the spindle such that a cavity exists between the spacer and the spindle, the spacer having plurality of perforations placing the hub sump and the cavity in fluid communication, the plurality of perforations arranged on the spacer such that at least one perforation is located at or below a minimum oil level in the hub sump when the wheelend is stationary; and a flow diverter proximal at least one of the plurality of perforations.

7. The wheelend of claim 6 wherein the flow diverter is a protrusion.

8. The wheelend of claim 6 wherein the flow diverter comprises a distribution vane.

9. The wheelend of claim 8 wherein the distribution vane comprises an input port and an output port where the input port, the output port, and the at least one of the plurality of perforations are in fluid communication with a radially extending passageway of the distribution vane wherein the distribution vane is configured to allow lubricant to flow into the input port, out the output port, out the at least one of the plurality of perforations.

* * * * *